M. OLSEN.
CHANGE SPEED GEARING.
APPLICATION FILED JUNE 28, 1912.
1,055,944.
Patented Mar. 11, 1913.
3 SHEETS—SHEET 1.
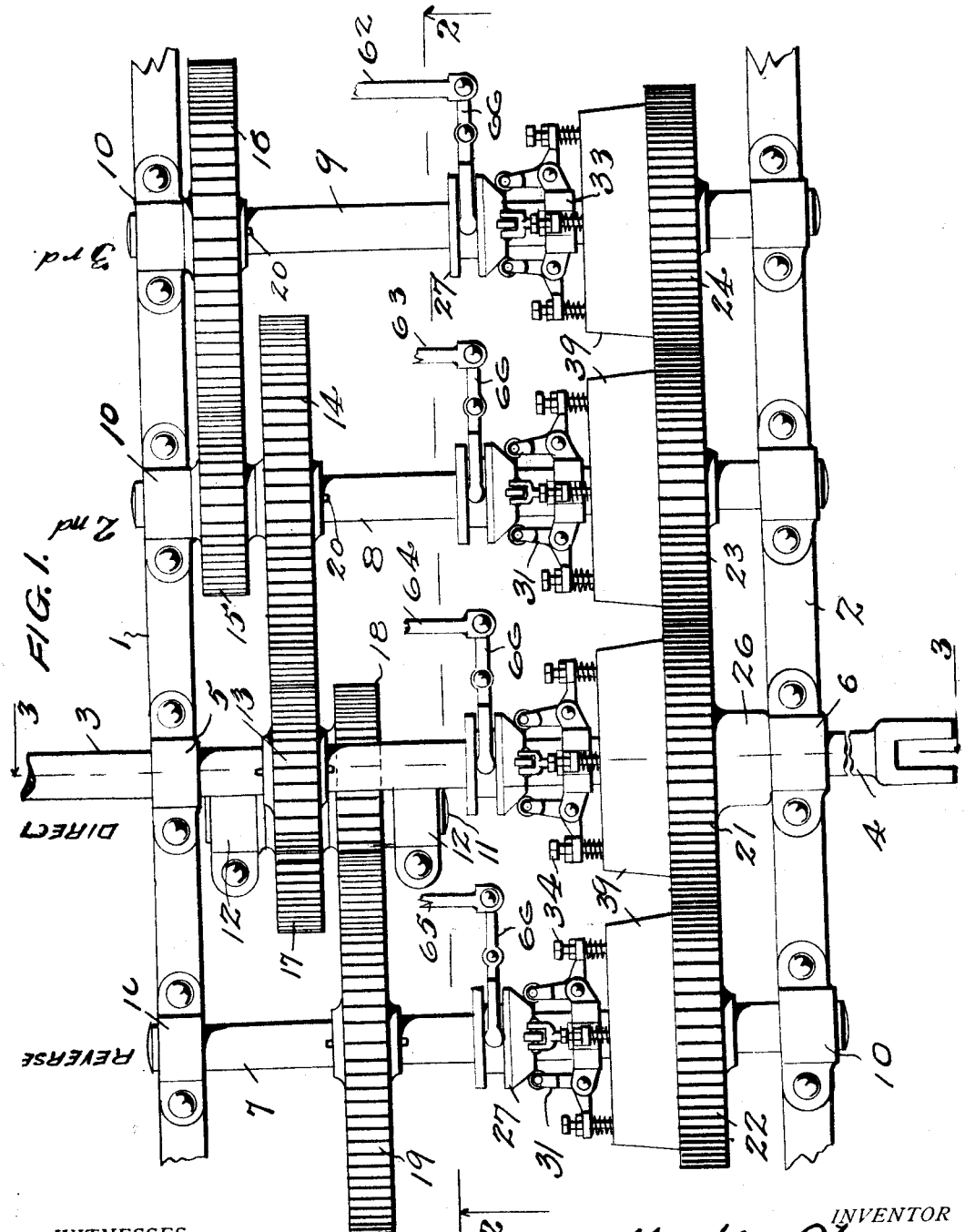
WITNESSES
C. K. Davis
M. L. Newcomb
INVENTOR
Martin Olsen
By Herman A. Phillips
Attorney

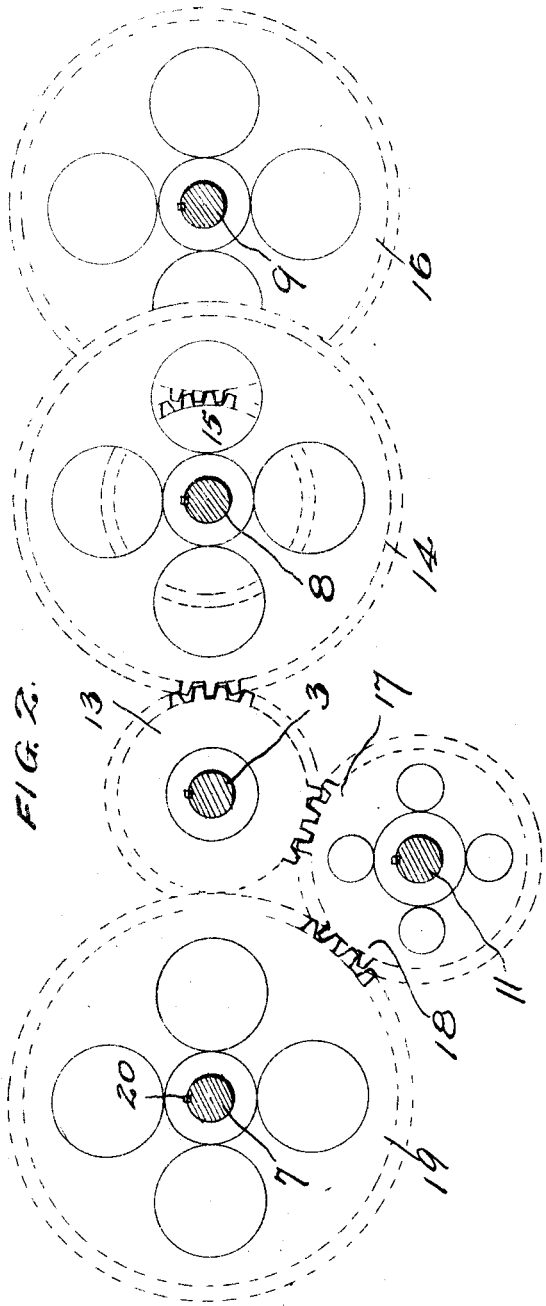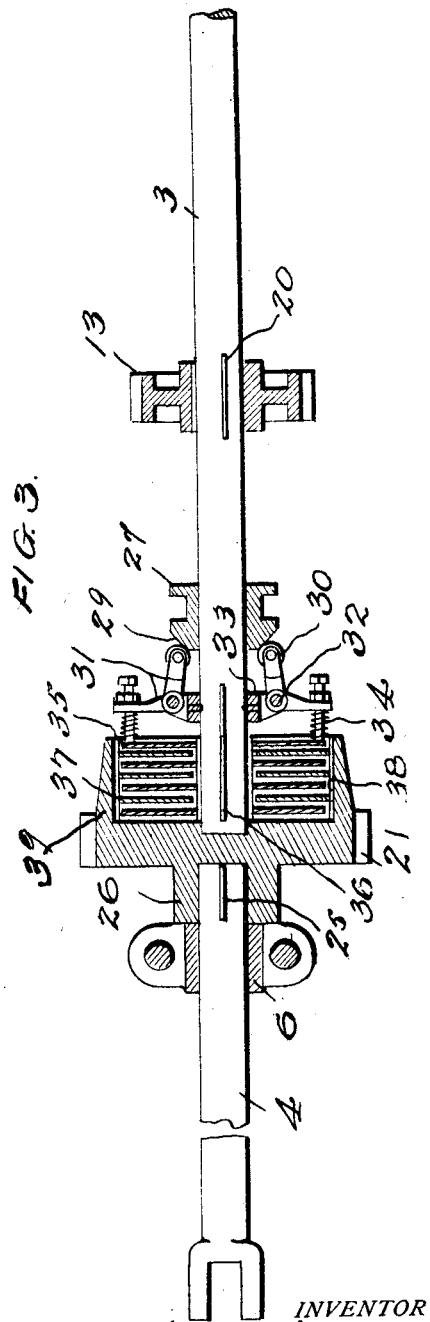

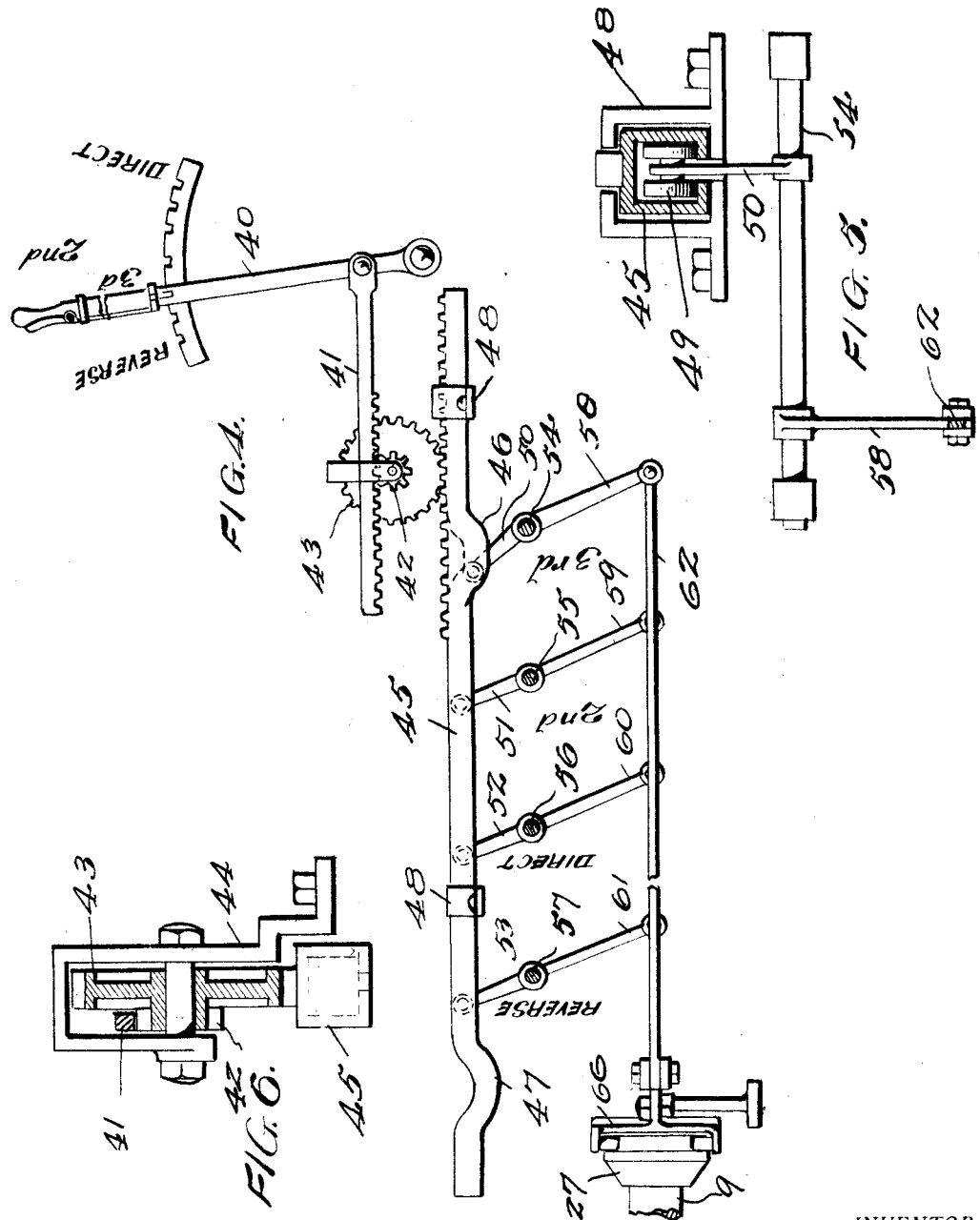

UNITED STATES PATENT OFFICE.

MARTIN OLSEN, OF ST. PAUL, MINNESOTA.

CHANGE-SPEED GEARING.

1,055,944.  Specification of Letters Patent.  Patented Mar. 11, 1913.

Application filed June 28, 1912. Serial No. 706,396.

*To all whom it may concern:*

Be it known that I, MARTIN OLSEN, a citizen of the United States, residing at St. Paul, in the county of Ramsey and State of Minnesota, have invented certain new and useful Improvements in Change-Speed Gearing, of which the following is a specification.

The present invention relates to improvements in change-speed gearing for use in various auto-vehicles and all steam and motor driven machines and is designed to overcome numerous difficulties and objections existing in present gearings of this type.

The prime object of the invention is the provision of change speed gearing which will eliminate the dangers of stripping the teeth of gearing when shifting from one speed to another; to provide a durable and simple device for this purpose; and to otherwise improve the construction of these devices. By the utilization of my gearing I am enabled to attain three or more speeds and a reverse, without the danger of duplicate locking of parts, because of the novel arrangement of gearing.

The invention consists in certain novel combinations and arrangements of parts as hereinafter pointed out and set forth in the claim.

In the accompanying drawings I have illustrated one example of the physical embodiment of my invention constructed according to the best mode I have so far devised for the practical application of the principles.

Figure 1 is a plan view of a change speed gearing involving my invention. Fig. 2 is a sectional view of Fig. 1 on line 2—2. Fig. 3 is a sectional view on line 3—3 Fig. 1. Fig. 4 is a detail view of the clutch actuating mechanism. Fig. 5 is a transverse sectional view of rack bar of the clutch mechanism showing a rocker bar, or shaft with arms thereon. Fig. 6 is a detail section of the rack wheel and rack bar of the clutch actuating mechanism.

In the preferred embodiment of my invention as illustrated in Fig. 1 the usual frame members 1 and 2 supporting the gearing, and the driving shaft or engine shaft 3, with the alined separate driven shaft 4, are journaled in bearings 5 and 6 respectively. In addition to the driving and driven shafts, I employ the reverse shaft 7; the second or intermediate speed shaft 8, and the third or high speed shaft 9, journaled in bearings 10, 10, and a stud shaft 11 suitably journaled as in bearings 12. The enumerated shafts are provided with meshing gears starting with shaft 3 which bears the gear or driving pinion 13. This pinion engages the gear 14 on shaft 8, and the smaller pinion 15 on said shaft engages the gear 16 on shaft 9. At the other side of the train of gears, the driving pinion 13 engages the idler 17 on stud shaft 11, and the second idler 18 on said shaft meshes with the gear 19 on the reverse shaft 7. Each of these gears 13, 14, 15, 16, 17, 18, 19, is keyed as at 20 to its shaft, and while the engine is running these wheels are continuously rotating, each with its shaft. The four clutch gears 21, 22, 23, and 24 are also in mesh with each other, and revolve continuously while the engine is running, and one of the clutches is in operative position.

Except for the presence of the two shafts, the driving and the driven shafts, each of the four clutches is similar, and the description of the clutch for actuating the direct or, engine driven gearing will suffice for an understanding of all the other clutches.

The driven shaft 4 is keyed as at 25 in the hub 26 of the gear 21, but the shaft 3, (as are also the shafts 7, 8, and 9) is loose in the gear 21. A slidable spool 27 is movable on the shaft 3, and its cone face 29 contacts with the rollers 30 carried on the bell crank levers 31, which are pivoted at 32 in the fixed sleeve 33. The end of each lever is provided with an adjusting bolt or screw 34 which bears against a contact plate 35. This plate is the outermost one of a series of four plates that are notched at diametrical points for engagement with the keys 36 fixed to the shaft 3, and the plates are slidable on and rotatable with the shaft 3. A second series of plates 37 with notches at their peripheries, to engage the keys 38 on the inner side of the cup 39, is slidable on the keys and is rotatable with the cup or casing.

The clutch actuating mechanism illustrated in Figs. 4, 5, and 6 illustrates one form of the application of the invention, but it will be understood that the results may be accomplished by other means than the arrangement illustrated. The actuating lever 40 has pivoted thereto a rack bar 41 which engages the small rack wheel 42 integral with the larger rack wheel 43. The rack wheels are supported in a frame 44 and wheel 43 engages teeth in a slidable rack bar 45. As illustrated this rack bar is hollow with a slot at its underside, and is formed with two depressions, as 46 and 47, the bar being slidable in the brackets or supports 48. Within the hollow slotted rack bar and adapted to roll on the lower portion thereof as a track, are four pairs of wheels 49, one pair each being carried by the crank arms 50, 51, 52 and 53 fixed on their respective rock shafts 54, 55, 56, and 57, and each said shaft is provided with a depending arm 58, 59, 60, 61 respectively. The respective arms 58, 59, 60, 61 are connected to their draw rods 62, 63, 64, 65, and each draw rod is connected to a forked, pivoted lever 66 which engages one of the spools 27.

In Fig. 4 the gearing is indicated as running at the 3rd or high speed, and this condition has been accomplished by moving the lever 40 to its indicated position. The friction rollers on the arm 50 are located in the depression or bend 46 and the shaft 54 has been rocked to the position indicated, thus engaging the members of the friction clutch of the gear 24 (Fig. 1). The driven shaft 4 is thus driven from shaft 3 which is rotating clockwise. Gear 13 on shaft 3 rotates clockwise, gears 14 and 15 counter-clockwise, gear 16 clockwise, and with it gear 24, gear 25 counterclockwise and gear 21 clockwise, thus rotating shaft 4 to drive the load. For 2nd speed the lever 40 is moved two notches to the right in Fig. 4, and this movement, through the medium of the rack 41 wheels 42 and 43, moves the rack bar 45 to the left. The wheels 49 of arm 50 rise from the depression 46 and the depression rides down the wheels and crank arm 51. This action engages the clutch of wheel 23 (after disengaging clutch of wheel 24) and the clockwise rotation of wheel 13 rotates wheels 14 and 23 counterclockwise which drives the wheel 21 clockwise. The direct drive is accomplished by throwing the lever 40 to the extreme left to engage the clutch of wheel 21 and the driven shaft is rotated directly from the driving shaft. In this position crank arm 51 is permitted to resume inoperative position, and the arm 52 is depressed with its wheels in the depression 46. By means of the depression 47 in the slide bar the reverse arm 53 is turned down to actuate the clutch of gear 22. While the reverse is in operation gear 13 rotates gears 17 and 18 counter-clockwise, gears 19 and 22 clockwise, and gear 21 counter-clockwise.

Having thus fully described my invention, what I claim as new and desire to secure by Letters Patent is:—

A change speed gearing including a driving and driven shaft in alinement and a gear on each shaft, an intermediate shaft, a gear thereon meshing with each of said gears, a third gear on the intermediate shaft, a high speed shaft, a gear thereon meshing with the said third gear, a second gear on the high speed shaft meshing with one of the gears on the intermediate shaft and provided with a clutch, and a clutch on the intermediate shaft.

In testimony whereof I affix my signature in presence of two witnesses.

MARTIN OLSEN.

Witnesses:
ROSE WALSH,
MAY CLARK.